US006256774B1

(12) United States Patent
O'Leary et al.

(10) Patent No.: US 6,256,774 B1
(45) Date of Patent: Jul. 3, 2001

(54) METHODS, SYSTEMS, AND COMPUTER PROGRAM PRODUCTS FOR STORING, LOADING, ANALYZING, AND SHARING REFERENCES TO RECENTLY USED OBJECTS

(75) Inventors: Daniel J. O'Leary, Mountain View; Robin Jeffries, Palo Alto, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/761,546

(22) Filed: Dec. 6, 1996

(51) Int. Cl.[7] .................................................. G06F 9/45
(52) U.S. Cl. ................................................................ 717/4
(58) Field of Search ................................. 395/701, 704; 717/4

(56) References Cited

U.S. PATENT DOCUMENTS

| | | | |
|---|---|---|---|
| 4,998,245 | * 3/1991 | Tanaka et al. | 370/432 |
| 5,220,516 | * 6/1993 | Dodson et al. | 717/4 |
| 5,249,231 | * 9/1993 | Covey et al. | 711/163 |
| 5,307,265 | * 4/1994 | Winans | 704/8 |
| 5,758,072 | * 5/1998 | Filepp et al. | 717/4 |
| 5,950,000 | * 9/1999 | O'Leary et al. | 717/1 |
| 6,012,126 | * 1/2000 | Aggarwal et al. | 709/203 |

FOREIGN PATENT DOCUMENTS

0851347 A2 * 1/1998 (EP) .................................. G06F/9/44

OTHER PUBLICATIONS

Sun Microsystems, Inc., "Copyright Page for Sun Microsystems, Inc.". Sun Microsystems Website [online], Mountain View, Ca:[retrieved on Jun. 25, 1999]. Retrieved from the Internet <http://www.sun.com/sims/demos/admin/SMI-Copyright.html>, 1994.*

Sun Microsystems, Inc., "ToolTalk User's Guide". Sun Microsystems Website [online]. Mountain View, CA; Sun Microsystems, Inc. [retrieved on Jun. 25, 1999]. Retrieved from the Internet: <http://www.decsy.ru/DUDL/ToolTalkUserGuide/tt_ug_1.html>,Jun. 1995.*

Reiss, S. P.,"Simplifying data integration: the design of the Desert software development environment". Preceedings of the 18th International Conference on Software Engineering, pp. 398–407. (abstract) IEEE/IEE Electronic Library Online [online], Mar. 1996.*

Gautier, B.; Loftus, C.; Sherratt, E., Thomas L. "Tool intergration; experiences and directions". ISCE '95 proceedings of the 17th international conference on Software engineering, pp. 315–324. (abstract) ACM Digital Library [online], Jan. 1995.*

Barrett. D.J.; Clarke, L.A.; Tarr, P.L.; Wise, A.E. "A framework for event–based software integration". ACM Transactions on Software Engineering and Methodology, vol. 5, No. 4, pp. 378–421. (abstract) ACM Digital Library [online], Oct. 1996.*

Sun Mircosystems, Inc., "Integrating Applications with the SPARCworks 3.0.1 Toolset". Sun Microsystems Website. [online] Mountain View, CA; Sun Mircosystems, Inc. [retrieved on Jun. 25, 1999]. <http://www.sun.com/workshop/wp–toolset/tooltalk.html<, Sep. 1994.*

* cited by examiner

Primary Examiner—James P. Trammell
Assistant Examiner—Kelvin Booker
(74) Attorney, Agent, or Firm—Robert P. Sabath; John F. Schipper (57) ABSTRACT

Methods, systems, and computer program products centrally manage references to objects recently employed by a user operating in a software development environment. After transmission of collection messages to plural applications, a receiver centrally managing object references receives an information block of object references. A writer of the centrally managing object references system writes the information blocks into memory. A reader further reads previously written information blocks to inform plural applications of what objects were previously referenced.

17 Claims, 8 Drawing Sheets

METHODS, SYSTEMS, AND COMPUTER PROGRAM PRODUCTS FOR STORING, LOADING, ANALYZING, AND SHARING REFERENCES TO RECENTLY USED OBJECTS

CROSS-REFERENCE TO RELATED APPLICATION

Related applications include "METHODS, SYSTEMS, AND COMPUTER PROGRAM PRODUCTS FOR CONTROLLING PICKLISTS," to Daniel J. O'Leary, U.S. Pat. Ser. No. 08/759,694; and "THIRD-PARTY TOOL INTEGRATION," to Daniel J. O'Leary and David A. Nelson-Gal, U.S. patent Ser. No. 08/761,547. These applications are filed on even date herewith, and the contents thereof are expressly incorporated herein by reference.

FIELD OF THE INVENTION

The present invention relates to software development tools and integrated computer software development environments, and more particularly to methods, systems, and computer program products for managing, storing, tracking, loading, and sharing references to objects such as source files, object files, source browser directories, and build targets, which are used in software development sessions.

BACKGROUND OF THE INVENTION

Selected computer software applications remember files used in recent program runs. Word processors such as WordPerfect for Windows particularly remember a limited number of recently used files, whether merely opened or actually saved. The order and the content of remembered lists of objects, including recently used files, are immutably fixed and controlled in these application programs. In one application, the order of the lists is updated only when a most recently used file in the list ceases to be the first entry on the list. In one other application that supports limited lists having a fixed maximum size, the addition of a new file to the list beyond the list maximum causes the oldest file in the list to be deleted. Thus, room is made for a new file entry, and the order of items in the list is updated to ensure that the most recently used file is first on the list. Such rigid approaches are of limited utility.

In known integrated software development environments, such as Symantec's Think C environment and Apple's Programmer's Workshop, file names relating to a selected project are stored in one or more lists to enable a programmer to track the files required to "build" a desired project. These lists are only updated when the files belonging to a project are modified. Even this approach is severely limited.

It is difficult for programmers to track recently used files, programs, and associated software tools, because of lack of a central tracking mechanism for such objects. This technical problem of lacking a central mechanism is in need of a solution. Lacking such centralized tracking, programmers are forced laboriously to shuttle between applications to collect information. It is, for example, particularly desirable to maintain references to particular files used in a well-known UNIX "make" utility, to describe which programs are built with which components, and to describe when changes to a first file require that a second file be re-compiled or when a program needs to be re-linked. A tool for aiding programmers in centrally tracking which files have been used recently and by which software tools they have been used, would certainly be desired in the software and computer arts.

SUMMARY OF THE INVENTION

According to the present invention, a custom software development environment manages, centrally tracks, and stores information identifying recently used objects (e.g., source files, object files, source browser directories, and build targets) that have been visited or used in a selected software development work session.

According to one embodiment of the present invention, a computer program product is embodied in code which is transformable by compilation into a form which can control a microprocessor to accomplish messaging between specialized tools of a selected integrated software development environment. In particular, the microprocessor controlled by the computer program product according to the present invention informs the respective specialized tools used in the integrated software development environment of recently used objects, which are to be added to or removed from particular tool-specific information lists. According to the present invention, particular tool specific lists contain references to recently used objects for a given tool. The tool specific lists are combined into a central list, called a WorkSet. The list describes the recently used objects and identifies the tools that used the particular objects. The present inventive method can be implemented on conventional data processing systems, personal computers, workstations, and network servers, and can be bundled for use in connection with conventional software programs used in integrated software development architectures.

DETAILED DESCRIPTION OF THE PREFERRED EMBODIMENTS

Figure 1:
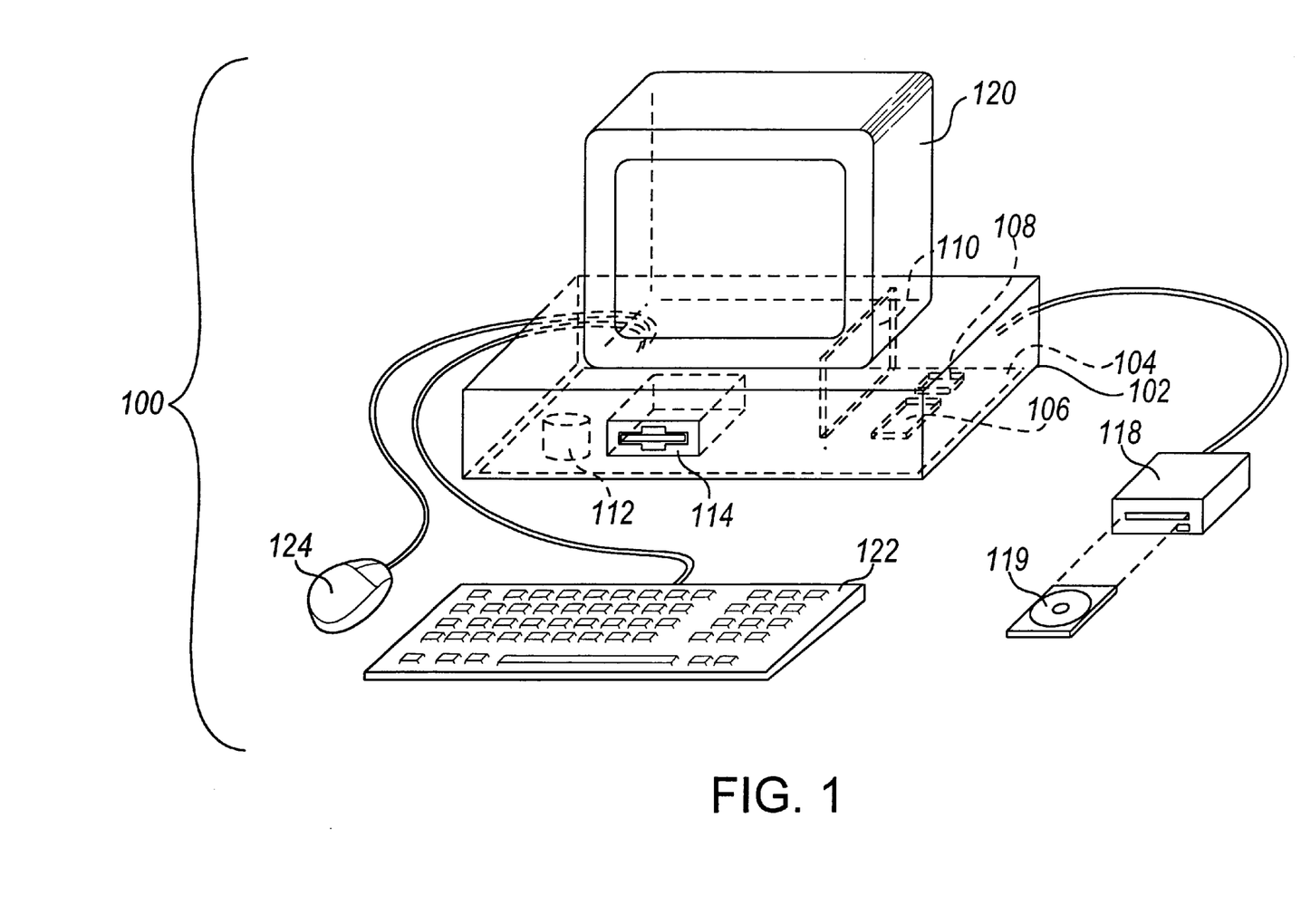
FIG. 1 is a schematic illustration of a prior art computer system configured to perform methods according to the present invention.

FIG. 1 is a schematic illustration of a conventional computer system 100 which is used for tracking, storing, loading, and sharing central lists of WorkSets according to the present invention. Computer system 100 includes a computer hardware housing 102, which in turn contains a motherboard 104 holding a central processing unit (CPU) 106 and a memory 108 associated with CPU 106. Computer system 100 further includes a display card driver 110 mounted on motherboard 104, a hard drive 112, a floppy disk drive 114, a compact disc (CD) drive 118, a compact disc 119 for installation in CD drive 118, a computer monitor 120, and input devices such as a keyboard 122 and a mouse 124. Display card driver 110 controls computer monitor 120. The various drives of computer system 100 are operable with corresponding various removable media input output devices such as compact disc 119, a tape, or removable magneto-optical media (the latter not shown) having various density media characteristics. These various components are interconnected in computer system 100 using appropriate device and system buses, e.g., a SCSI bus or an Enhanced IDE bus. Although compact disc 119 is shown in a CD caddy, it can instead be inserted directly into CD-ROM players that do not require caddies. Computer system 100 may additionally include a compact disc reader/writer 118 and a compact disc jukebox (not shown). In addition, a printer (not shown) can be connected in computer system 100 to produce printed lists of WorkSets. Computer system 100 comprises at least one computer readable medium. A computer readable medium that can be used in connection with the present invention may be a compact disc, a hard disk, a floppy disk, a tape, a magneto-optical disk, a PROM, an EPROM, an EEPROM, a Flash PROM, a DRAM, or an SRAM, for example. Software according to the present invention can be stored on any one or on a combination of these computer readable media as a computer program product or a part thereof. Such software can control the hardware of computer system 100 and can enable computer system 100 to interact with a human user. Software that can be used in connection with the present invention include, but is not limited to, device drivers, operating systems, and user applications including software development tools. Computer readable media for storing such software includes computer program products according to the present invention for tracking, storing, loading, and sharing central WorkSet lists.

A function performed on computer system 100 according to the present invention is creation and maintenance of programs in a selected software development environment. Such a development environment employs selected individual tools including but not limited to editors such as vi, Emacs, or text tool editors, assemblers, compilers, linkers, make utilities, debuggers, profilers, graphical user interface tools, and version control systems. Due to the complexity of many large software projects, computer assistance in maintaining individual projects and their components is essential. Computer support according to the present invention includes an integrated software development environment that combines selected software tools under the control of an integrated software development environment manager.

A typical maintenance cycle for a software project begins by editing a graphical user interface description file to generate new source code, editing a source file to correct errors, or editing a source file to include code enhancements. Then, the newly edited code is compiled or assembled using a compiler or assembler, by invoking a make or build utility. Thereafter, the specified pieces are linked into a new program, and the newly created program is debugged to test program fixes and enhancements which have been made. If the maintenance cycle starts after program build, because of a speed related problem, a profiler is used to detect which portions of a code run consume the most execution time. This enables a programmer to concentrate on slow areas of code in an effort to enhance overall program performance.

Although known source code control systems enable a user to track the revision history of a program, known source code control systems do not show which tools have utilized a particular file or application and how the file or application was used. As shown in attached Appendices A-C, the present invention uses central WorkSet lists to track that tools have accessed particular files or source directories. In accordance with the present invention, a WorkSet manager acts as an integrated software environment shell with tools which receive, process, and save tool specific information 200. An exemplary WorkSet file is shown in Appendices A-C and contains a file header 220 identifying the type of the file, optional comments 224 identified by a predetermined identifier, e.g., lines starting with the number symbol ("#"); and references to particular objects, e.g., files or directories, that have been used by a file tool (such as an editor for example), a build utility, a debugger, or a graphical class browser. In each case, tool specific information 200 is stored in a WorkSet file according to the present invention. In the case of a file tool used for tracking text files, the file specific information is stored in a file tool block 204 that describes particular objects used by the file tool. A first line of file tool block 204 indicates that the tool tracks so-called "FileData", i.e., data related to a particular file. Further, since typically a file tool is customarily used at the beginning of a software development cycle, the file tool also stores, on a second line, the process directory of the WorkSet manager, i.e., the directory in which the WorkSet manager was operating when a particular WorkSet was saved. The identifier "." indicates that the information stored in the WorkSet file is stored in the same directory from which the WorkSet manager was launched, although not necessarily in the directory in which the executable version of the WorkSet manager exists. Since a user can instruct the text tool to store WorkSets in a directory different than the process directory for the WorkSet manager, line three of the file tool information stores the directory that the file tool currently is using as a base directory for loading and storing files. The current directory can be either a relative directory, as shown for the file tool, or an absolute directory beginning with "/", as shown for the "currentDirectory" entry of the graphical class browser block 216. A fourth line of file tool block 204 contains an object type identifier 235 that suggests that the particular file tool tracks a list of files. File tool block 204 particularly includes an indication of which files have been used recently, e.g., test.c, workset.c and "/home/djo/src/test/beta/bugs.lst". As noted above, names of recently used files also are either relative to a working directory, e.g., test.c; or absolute, e.g., "/home/djo/src/test/beta/bugs.lst".

The tool specific information 200 for the build utility is provided as build block 208. This block indicates that the build tool tracks "BuildData." The current directory of the build tool when the WorkSet was saved is the same as the process directory. Further, object type identifier 235 indicates that the build tool tracks a list of "targets" for build operations, i.e., a list of programs to be built according to a specified set of rules contained in a "make" file. Build block 208 also indicates that the build utility in fact built the default target of the default "make" file which is stored in the "/home/djo/src/motif/ch02" directory, by invoking a "make" command. In this way, not only are references to files saved, but associated directories and commands are also preserved. Similarly, debug block 212 includes an object type identifier 235 that indicates that the debug tool tracks "Debug Data". "Debug Data" includes a list of programs and specifically stores information indicating that the program "/home/djo/src/motif/chO2/hello" has been debugged recently. When "hello" is debugged, "hello" is not invoked with "quickRun" option. An advantage derived by using a current directory as part of tool specific information 200 is that the WorkSets thereby become conveniently portable between directories and machines. If a first programmer implements a change on a first set of source code which is being developed in parallel with a second set of source code, then the first programmer can conveniently share the particular WorkSet with a second programmer for making a corresponding change in a second set of source code. Accordingly, software development time is substantially reducible by compact encapsulation of information not only about files that have changed, but also about the associated processes by which the files have been changed.

Although a WorkSet file has been described with a particular structure herein, numerous variations of the file are possible in accordance with the present invention. Many different file layouts and line orderings can be employed within the meaning of the present invention. Such variations in layout and orderings are distinguishable by a file header 220 describing the selected variation. According to one embodiment of a WorkSet file according to the present invention, an object type identifier 235 includes a description of the structures of the objects in the list, rather than merely a name for the object type identifier 235. As is described in detail below, preserving information regarding the structures of objects helps particular software applications. Build tools for example can thereby dynamically determine formats with which to send or communicate particular entries such as program entries 260 to other software applications, such as a debug tool. Similarly, WorkSet information may be written using a format that is self-describing to aid in the construction of object references for a list.

Figure 2:
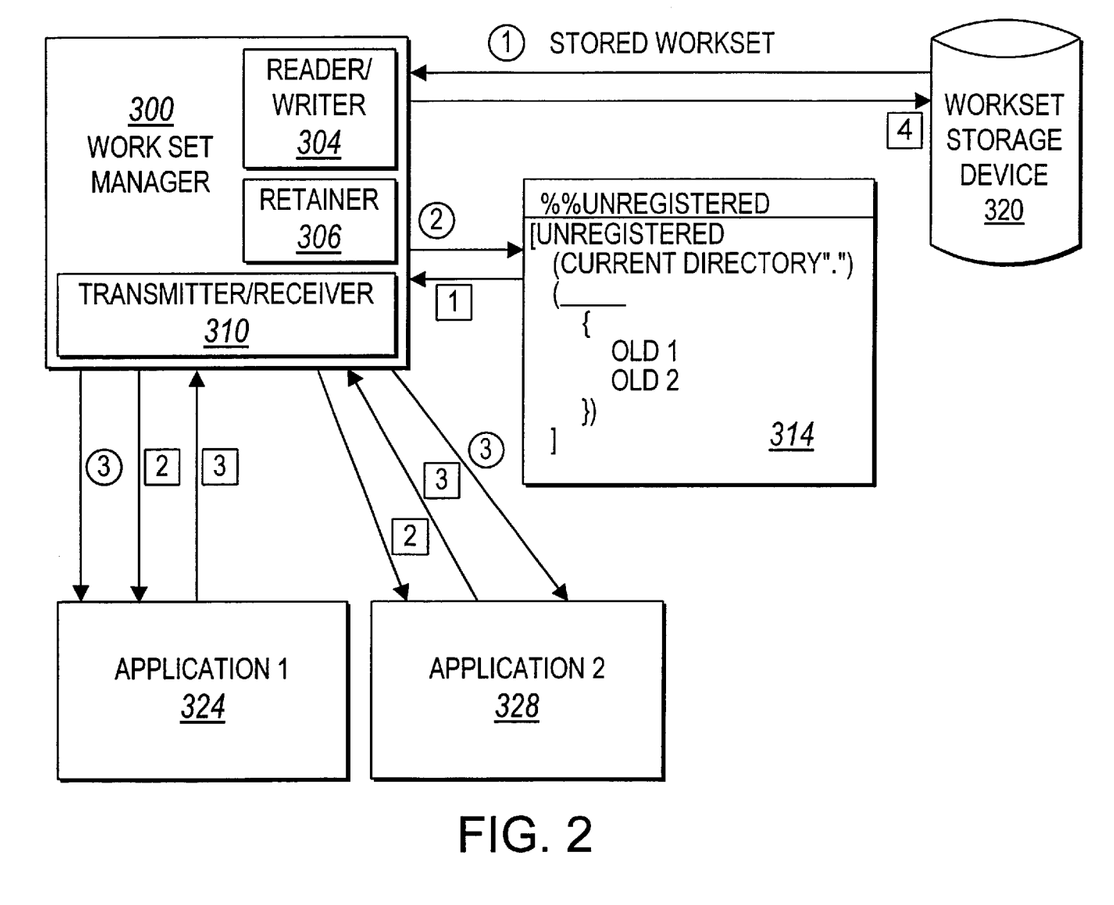
FIG. 2 is a schematic illustration of a system for tracking, storing, and loading WorkSet lists, according to the present invention.

FIG. 2 is a schematic illustration of a system according to the present invention, which can be implemented in many ways, including with specialized circuitry (either hard-wired or dynamically configurable such as field programmable gate arrays), or with a central processing unit and associated memory. WorkSet manager 300 according to the present invention particularly includes a reader/writer 304 for reading WorkSets from and writing WorkSets to a WorkSet storage device 320 (e.g., a computer storage device such as a hard disk 112), a retainer 306 (e.g., a computer memory) for retaining tool specific information 200 and corresponding program identifiers 230, and a transmitter/receiver 310 for transmitting and receiving messages to and from first and second applications that can use information contained in Worksets, respectively 324 and 328. As shown by the sequence of encircled numbers indicated in FIG. 2, and as described in greater detail with reference to FIGS. 3 and 5, WorkSet manager 300 first reads a WorkSet stored in WorkSet storage device 320 by using the reader/writer 304. WorkSet manager 300 then utilizes retainer 306 to preserve tool specific information 200 and program identifiers 230 in memory 314 for unregistered blocks. Transmitter/receiver 310 then transmits tool specific information 200 to the particular one of applications (324 and 328) which has registered that tool specific information 200 corresponding to the current program identifier 230 should be sent to it. Conversely, when storing a WorkSet, as shown by the numbers contained in squares shown in FIG. 2, and as described in greater detail with respect to FIGS. 4 and 7, WorkSet manager 300 coordinates collection and storage of tool specific information 200 from each of the applications and writes collected and retained tool specific information 200 to WorkSet storage device 320.

Figure 3:
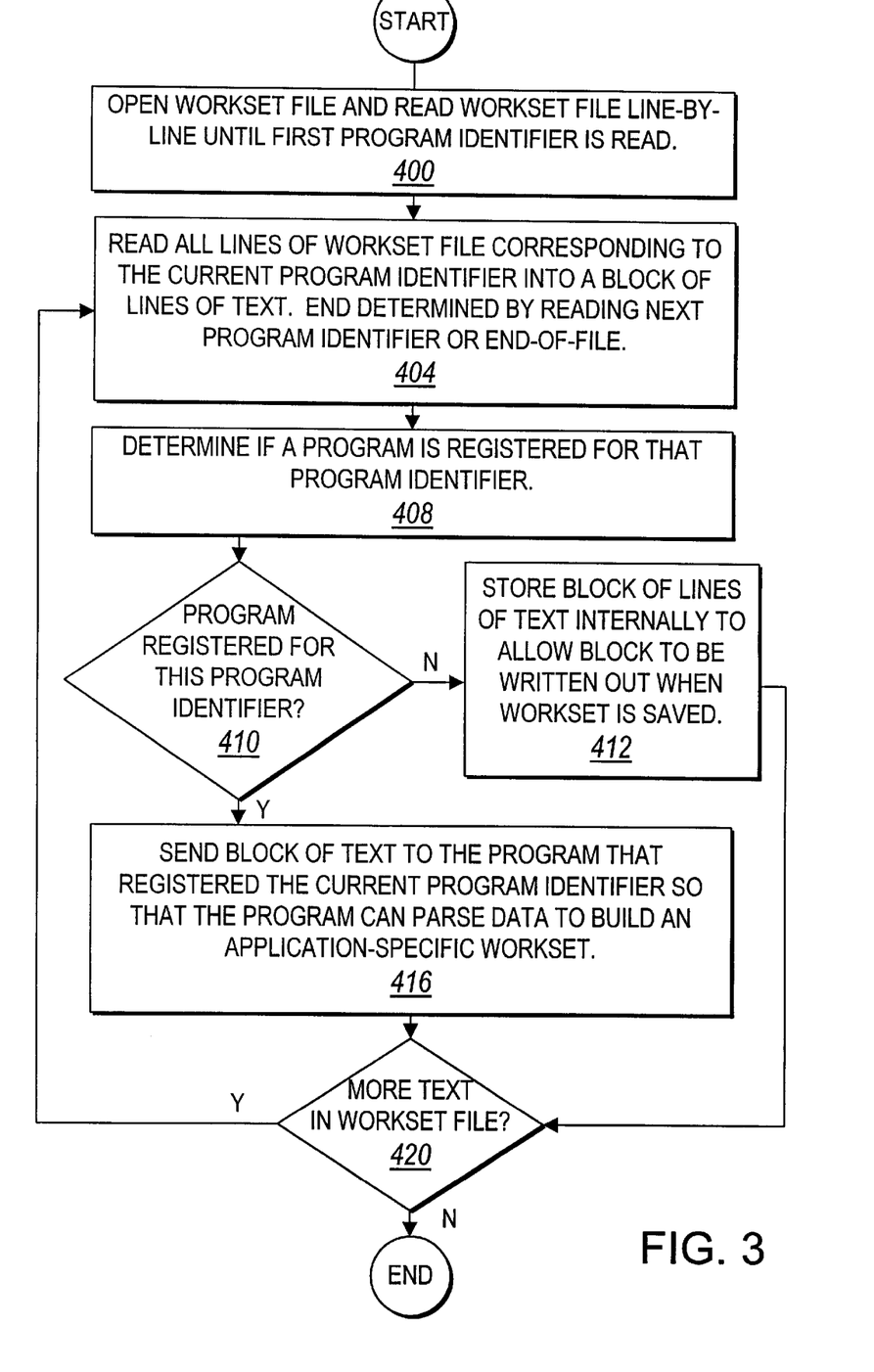
FIG. 3 is a flowchart of a method according to an embodiment of the present invention for loading a central WorkSet list from a selected file.

FIG. 3 shows in greater detail a method according to the present invention for reading a WorkSet by a WorkSet manager 300 and transmitting tool specific information 200 to particular applications 324 and 328. In step 400, a selected WorkSet file, such as the WorkSet file shown above for example, is opened and read line-by-line until, ignoring comments 224, a first program identifier 230 is found. Program identifiers are shown beginning with an unusual character pair such as "%%" for example to aid in parsing the WorkSet file. According to step 404, the WorkSet file is read line-by-line until a next program identifier 230 or an end of file is reached. In the case of a "%%File" program identifier 230, the lines of file tool block 204 are assembled as a block of lines of text. In step 408, WorkSet manager 300 determines if a WorkSet-aware application (324 or 328), e.g., a modified version of Emacs, has been registered to process file tool block 204. When step 410 determines that there is a WorkSet-aware program (e.g., 324 or 328) that is registered for "%%File" program identifier 230, WorkSet manager 300 continues to step 416 and sends the identified block of lines of text to the program that registered the current program identifier 230, i.e., the "%%File" identifier. This block of lines of text may be sent through any appropriate communication mechanism, e.g., sockets, shared memory, named pipes, or windowing messages, as the case may be. In an integrated software development environment, Tooltalk® messages are one method of sending messages between WorkSet-aware applications. Tooltalk is a name which has been registered by Sun Microsystems, Inc., as a trademark with the U.S. Patent and Trademark Office. Tooltalk is an inter-application communication protocol system providing a useful messaging service that enables convenient tool interchanges. Also, although described in terms of blocks of lines of text for convenience and ease of explanation, the blocks may include binary or compressed data, according to an embodiment of the present invention. Each of these representations is intended to be covered by the phrase "information blocks" as in file tool block 204 or build block 208.

Continuing with the description of FIG. 3, if according to step 410 it has been determined that no program has been registered for a most recently read program identifier 230, or that the program that was registered for this program identifier 230 could not be started, then WorkSet manager 300 moves from step 410 to step 412. According to step 412, WorkSet manager 300 stores a block of lines of text internally so that WorkSet manager 300 can write the same block back to the WorkSet file when the WorkSet is saved. By internally storing the block of lines of text, WorkSet manager 300 prevents useful tool specific information 200 from being discarded from the WorkSet during times in which a program, which is normally registered for a program identifier, has been accidentally unregistered or is temporarily unavailable, e.g., because of a network failure. WorkSet Manager 300 transitions to step 420 after step 412 has been performed, and in step 420 WorkSet manager 300 determines whether or not there is more text in the WorkSet file which represents new tool specific information 200.

Figure 4:
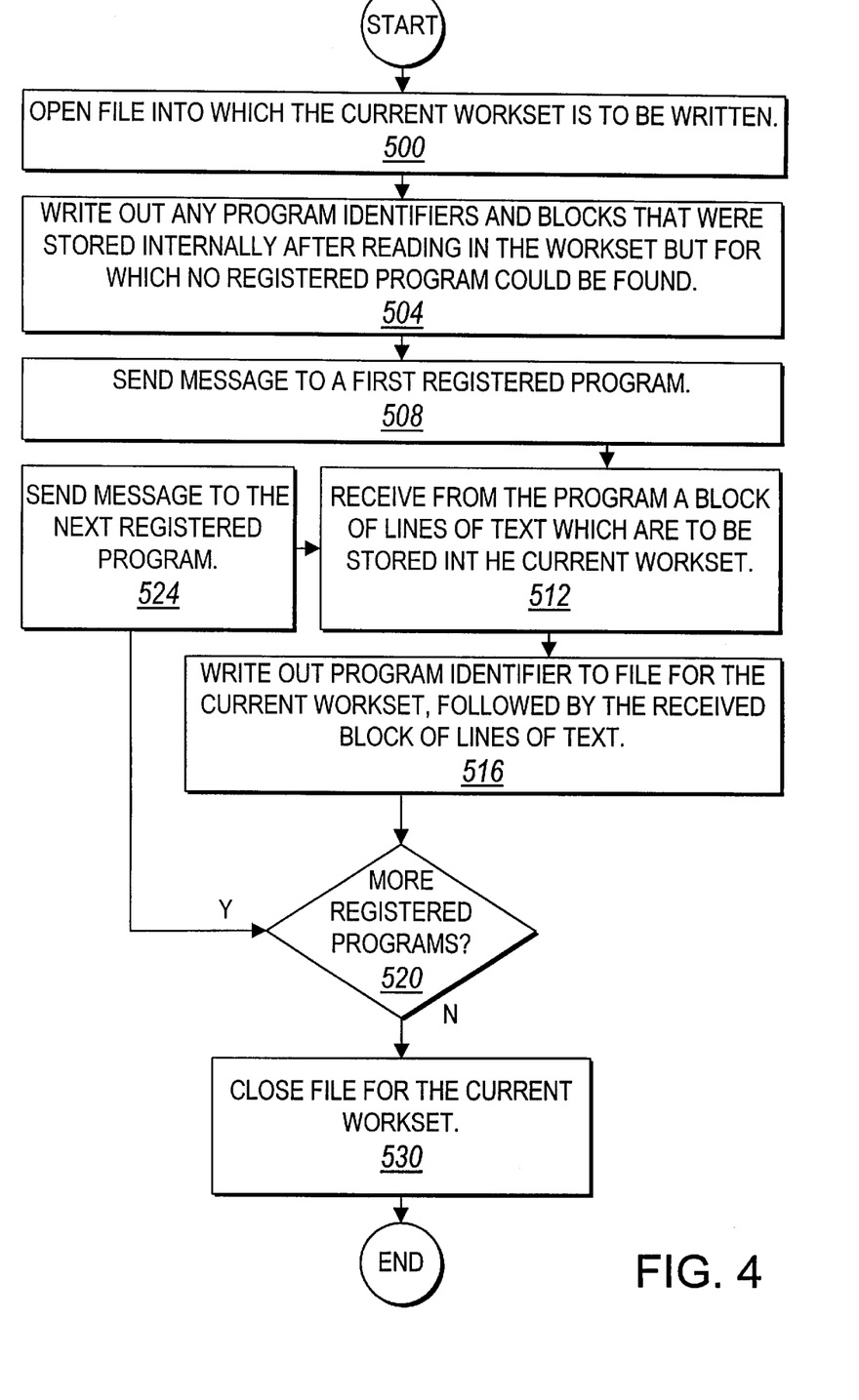
FIG. 4 is a flowchart of a method according to the present invention, for saving a central WorkSet list to a selected file.

FIG. 4 is a flowchart showing how a WorkSet is saved according to an embodiment of the saving method. This saving method is used with a WorkSet that is loaded according to the method of FIG. 4. In step 500, WorkSet manager 300 opens a file into which the current WorkStep is to be written. In step 504, the system writes to the current WorkSet file any program identifiers and blocks that were stored internally, but for which no registered program has been found or started. According to step 508, a collection message is sent to a first registered WorkSet-aware application (324 or 328) to request that the first registered application send WorkSet manager 300 a first information block. The first information block is to be stored in the current WorkSet file on behalf of the first registered application. In step 512, the WorkSet manager 300 receives the information block which is to be stored in the current WorkSet file. The WorkSet Manager 300, in step 516, write out the program identifier 230, followed by the first information block received from the first registered application. In the decision step 520, WorkSet manager 300 determines whether or not more registered applications exist, and if so, WorkSet manager 300 transitions to step 524 and the next registered application is sent a message, and the processing loop of steps 512, 516 and 520 is repeated for the next registered application and its associated information block. If the system, in step 520, determines that there are no more registered applications, control passes to step 530 so that the file for the current WorkSet file can be closed for later retrieval, copying, or sharing.

Figure 5:
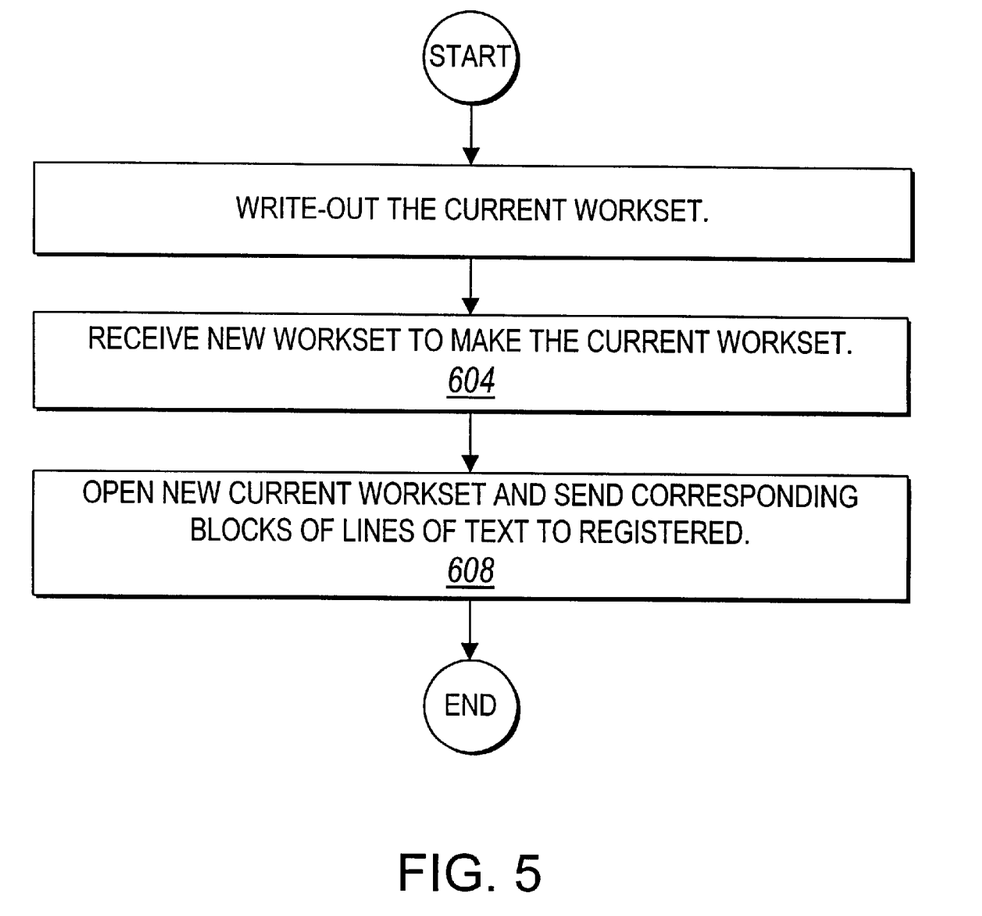
FIG. 5 is a flowchart of a method according to the present invention for changing from a current central WorkSet list to a new central WorkSet list.

In addition, since WorkSets are self-contained entities, a current WorkSet can be saved and a new WorkSet opened when a user is changing between separate activities. In this way, a user can easily distinguish between a WorkSet for a first project and a WorkSet for a second project. FIG. 5 shows a process for changing between WorkSets. In step 600, the current WorkSet is written out according to the method of FIG. 4 or FIG. 7. In step 604, WorkSet manager 300 receives the name or other identifier of another WorkSet to use instead of the current WorkSet and sends the corresponding blocks to be registered. In step 608, the WorkSet manager 300 then opens the other WorkSet as a new current WorkSet. Step 608 can be performed by the methods of FIG. 3 and FIG. 6 respectively after the writing of step 600 has been performed using the methods of FIGS. 4 and 7, respectively.

Figure 6:
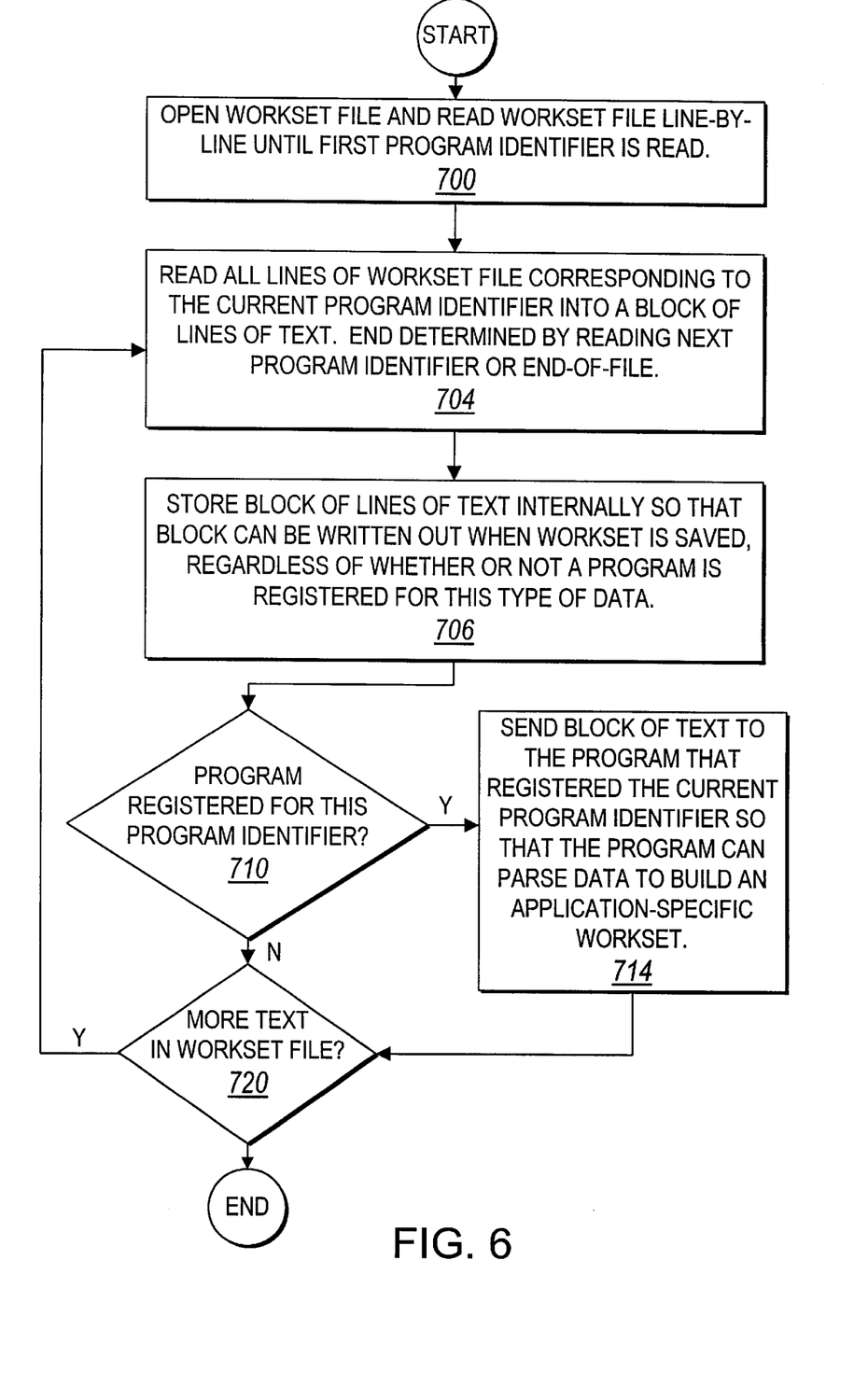
FIG. 6 is a flowchart showing another method according to the present invention for loading a central WorkSet list from a selected file, to enable preservation and recovery of WorkSet information after crashes of particular applications that have received tool specific information blocks.

FIG. 6 is a flowchart of another embodiment according to the present invention, describing the process of loading WorkSets according to the present invention from a selected WorkSet file and sending tool specific information 200 to specific registered applications. Steps 700 and 704 involve performance of steps similar or equivalent to corresponding steps 400 and 404 of FIG. 3, during which time the applicable WorkSet file is opened and read line-by-line until a first set of tool specific information 200 has been read. All lines of a WorkSet file corresponding to the current program identifier are read into a block of lines of text. The end of the WorkSet file is determined by reading either an end-of-file symbol or the next program identifier. In step 706, WorkSet manager 300 stores the most recently read information block received from the WorkSet file. In the processing of the file according to FIG. 7, this information block can be saved back to the WorkSet file in case there is no application registered for this program identifier, or in case there is a registered application for this program identifier but the registered application cannot be started, or in case there is a registered application for this program identifier and it has been started but the registered application is not responding to requests for tool specific information 200. If the registered application has amended its tool specific information 200 but has then crashed, WorkSet manager 300 writes out previous tool-specific information 200 to a current WorkSet file. After step 706, the method according to the present invention continues with step 710 to determine whether or not there is a registered application according to this program identifier 230. If such an application is identified, control passes to step 714 which calls for sending the information block to the application that registered the current program identifier 230 so that the program can parse data in order to build an application specific WorkSet. Control passes from both steps 714 and 710 to step 720 where it is determined whether or not more text exists in the current WorkSet file. If step 720 determines that there is more text, control is returned to step 704 to repeat the processing of steps 704/706/710/720 or 704/706/710/714/720 until the system in step 720 determines that no more text is available in the WorkSet file and terminates the program.

Figure 7:
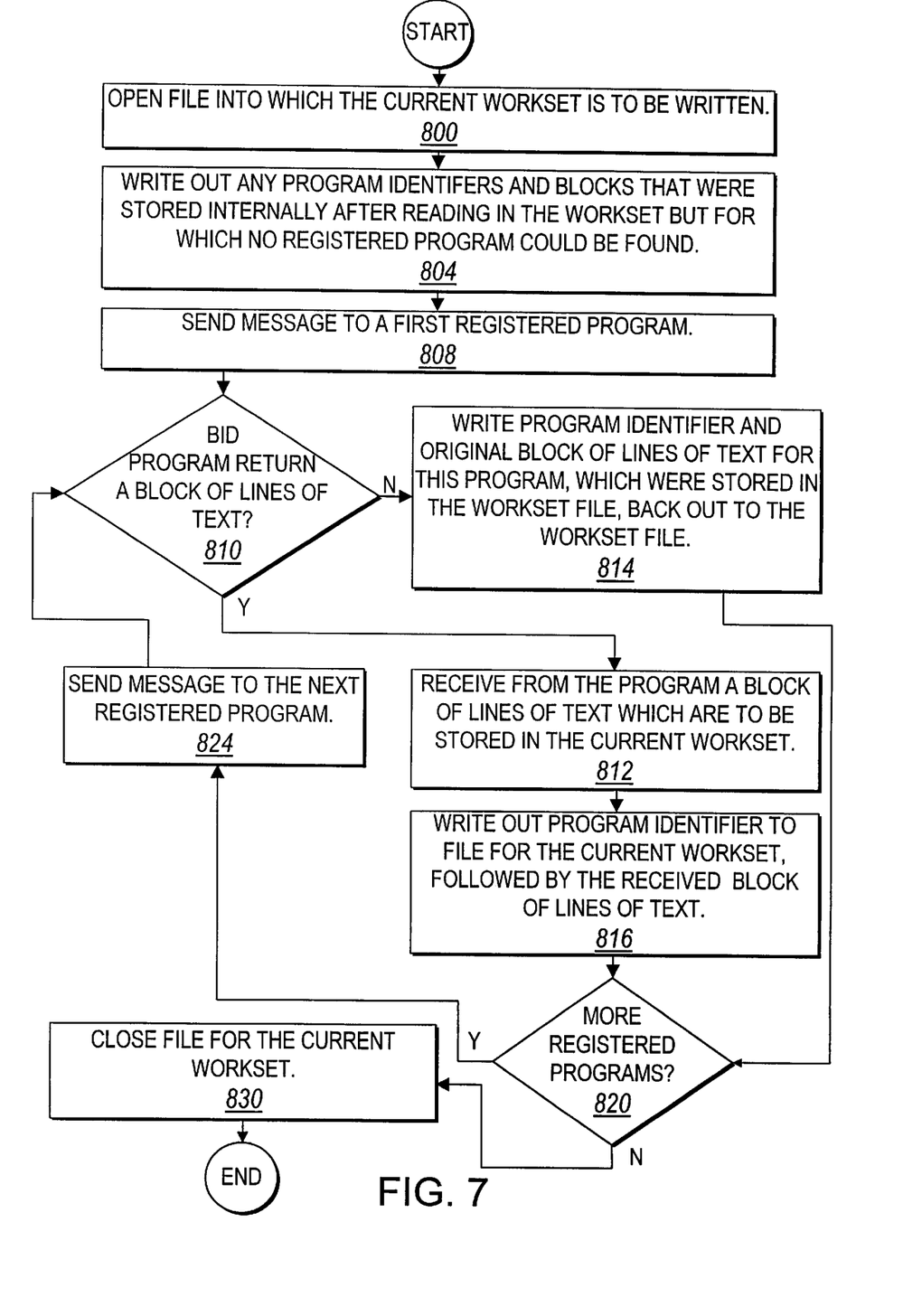
FIG. 7 is a flowchart of a method according to the present invention in which central WorkSet lists are stored in a selected file to preserve WorkSet information for subsequent recovery after crash of particular programs that have received tool specific information blocks.

FIG. 7 is a flowchart showing another embodiment according to the present invention, including storing data according to the present invention into a WorkSet file under the control of a WorkSet manager 300 with the cooperation of WorkSet-aware applications. According to step 800, the file into which the current WorkSet is to be written is opened. Then, according to step 804 any tool specific information 200 is written out, including a program identifier 230 that was stored internally after reading in the WorkSet, for example, using the method of FIG. 6, but for which no registered application could be found. According to step 808, the first registered application 324 is sent a message to cause it to return its tool specific information 200 to be added to the current WorkSet file. According to step 810, the system determines whether or not the first registered application returned an information block, e.g., a file tool block 204. If according to step 810 it is determined that an information block has not been returned, control passes to step 814. According to step 814, WorkSet manager 300 writes out the current program identifier 230 and further writes the original information block for the first registered application 324, originally stored in the WorkSet file, to the current WorkSet file. If according to step 810, it is determined that the information block has been returned, the method of storing continues with step 812. In step 812, WorkSet manager 300 receives an information block and passes to step 816 to write out to the current WorkSet file tool specific information including a program identifier and the information block received from the applicable application. After completion of either step 814 or step 816, control passes to step 820 that determines whether or not any additional registered applications exist to be contacted. If more registered applications exist, control passes from step 820 to step 824 so that a message can be sent to the next registered application. From step 824, control is returned to step 810 to determine whether or not a next registered application has returned an information block, or if there appears to be an error which prevented the information block from being returned. After steps 810 through 820 are completed and the system in step 820 determines that there are no more registered applications, control is passed to step 830 which causes the current WorkSet file to be closed for later retrieval, copying, or sharing.

Although discussed above in terms of references to recently used objects, WorkSets can also represent references to objects that are expected to be used at a later time in an integrated software development environment. For example, as build target 250 of the build block 208 shows in Appendix A, the build tool has recently built a default target of the default Makefile in the directory "/home/djo/src/motif/ch02" by invoking the "make" command. If the build tool builds the program "hello" through the "make" process, the build utility may also send the debugger application a message indicating that there is a "new" program that the user may be interested in debugging. Based on this information, the debugger can add the program "hello" to debug information 212, as is shown at program block 260 in Appendix C. This process of passing tool specific information 200 between applications is aided by the use of the description of the structure of an object identified by object type identifier 235. Applications using the structure information are aided in sending compatible messages based on the structure. Otherwise, the receiving application may be forced to perform more extensive error checking when receiving tool specific information 200, or applications may accidentally send out of date structures between applications.

Figure 8:
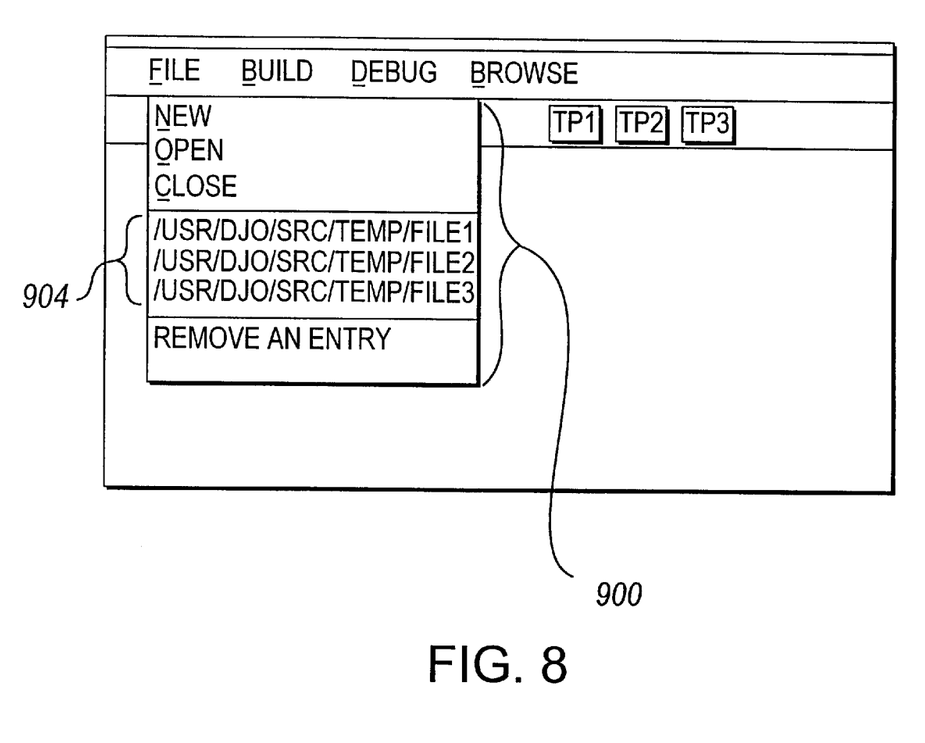
FIG. 8 is a schematic illustration of a picklist that displays tool specific information with respect to a WorkSet-aware tool.

In addition to storing lists of recently used objects, the present invention also encompasses displaying particular lists to a human user to aid in software development. Although particular lists can be printed, the lists are desirably displayed as dynamic extensions to selected menu items. These extensions are called picklists, as shown in FIG. 8. The process of passing messages between cooperating applications and synchronizing the picklists of an integrated software environment manager and individual tools of the integrated software environment is described in detail in a copending application entitled "Third-Party Tool Integration."

Also, although discussed above in terms of adding new information to tool specific information 200 to reflect recently used or soon-to-be-used objects, object references may also be removed from tool specific information 200 by tools, including the integrated software environment manager. By removing references to unintentionally visited objects or objects that a first tool believes a second tool will use soon but which are not actually used, the tool specific information 200 can be reduced to more compactly describe intended interactions of a user which are recorded in a WorkSet file. A method for removing entries from tool specific information 200 is further described in the above-referenced copending application relating to Picklist Editing, and a method for synchronizing the removal of entries from plural tools in an integrated software environment is described in the copending application entitled "Third-Party Tool Integration."

In addition, although discussed above in terms of saving WorkSets to and loading WorkSets from files, the present invention also encompasses using a database to save and load WorkSets. The reader/writer 304 which reads and writes files would according to such an embodiment be replaced by a modified reader/writer 304' which uses database commands to perform the saving and loading. For example, when using an SQL-style database, entries added according to the present invention by using "insert" commands are modified using "update" commands, and are retrieved using "select" commands. With such a modified system, tool specific information 200 of unregistered applications is not stored internally in WorkSet manager 300 and written out to a WorkSet file when saving the file. Instead, the tool specific information 200 is automatically retained in the database, and retainer 314 consequently is omitted.

Numerous modifications and variations of the present invention are possible in light of the above teachings. It is therefore to be understood that, within the scope of the appended claims, the invention may be practiced otherwise than as specifically described herein.

What is claimed is:

1. A computer system for centrally managing references to an object used by a selected application, the computer system comprising:

a computer system storage device that comprises a hard disk;

a transmitter configured to send a collection message to two or more applications in a selected software environment;

a receiver configured to receive an information block from at least one application in response to receipt by at least one of the applications of the collection message, the information block including at least one reference to at least one object recently used by the at least one application; and a writer configured to write information blocks received from the at least one application to the computer storage device, where at least one information block written by the writer identifies at least one object and identifies all tools that used the at least one object.

2. The computer system according to claim 1, wherein said writer further comprises a program identifier writer configured to write a corresponding program identifier to said computer storage device for said information block received from said at least one application.

3. The computer system according to claim 2, further comprising a reader configured to read a second set of at least one information block from said computer storage device, where said transmitter is configured for transmitting the second set of at least one information block read by said reader, for said at least one application.

4. The computer system according to claim 2, further comprising a reader configured to read said information blocks written by said writer, wherein said transmitter is configured for transmitting at least one information block read by the reader to said at least one application, where at least one information block read by the reader identifies said at least one object and identifies all tools that used said at least one object.

5. The computer system according to claim 1, wherein said computer storage device further comprises a database.

6. The computer system according to claim 1, where said transmitter is configured to transmit inter-application communication protocol messages, and said receiver is configured to receive inter-application communication protocol messages, thereby providing a useful messaging service which enables convenient tool exchanges.

7. A method for managing references to objects recently used by one or more applications in a computer, the method comprising:

transmitting a collection message to two or more applications in a selected software environment;

receiving an information block from at least one application in response to receipt by the application of the collection message, the information block including at least one reference to at least one object recently used by the at least one application; and writing the information blocks received from the at least one application to a selected computer storage device that comprises a hard disk, where at least one information block written by the writer identifies at least one object and identifies all tools that used the at least one object.

8. The method according to claim 7, further comprising including writing a corresponding program identifier to said computer storage device for an information block received from said at least one application.

9. The method according to claim 8, further comprising:

reading a second set of at least one information block from said computer storage device; and transmitting the second set of at least one information block to said at least one application.

10. The method according to claim 8, further comprising:

reading an information block which has been written in said computer storage device, where at least one information block read by the reader identifies said at least one object and identifies all tools that used said at least one object; and transmitting at least one of the information blocks which has been read to a selected application.

11. The method of claim 7, wherein writing to said computer storage device further comprises writing to a selected database.

12. The method according to claim 7, further comprising:

transmitting at least one inter-application communication protocol message; and receiving the at least one inter-application communication protocol message.

13. A computer program product comprising:

a computer storage medium and a computer program code mechanism embedded in the computer storage medium for causing a computer to manage references to objects used by at least one application, the computer code mechanism comprising:

a first computer code device configured to transmit a collection message to the at least one application a software development environment;

a second computer code device configured to receive an information block from the at least one applications in response to receipt of the collection message, the information block including at least one reference to at least one object used by the at least one application; and a third computer code device configured to write information blocks received from the at least one application to a selected computer storage device that comprises a hard disk, where at least one information block written by the third computer device identifies at least one object and identifies all tools that used the at least one object.

14. The computer program product according to claim 13, wherein said third computer code device further comprises a fourth computer code device configured to write a corresponding program identifier to said computer storage device for said information block received from said at least one application.

15. The computer program product according to claim 13, further comprising:

a fourth computer code device configured to read a second set of at least one information block from said computer storage device; and a fifth computer code device configured to transmit the second set of the at least one information block to the at least one application.

16. The computer program product according to claim 13, further comprising:

a fourth computer code device configured to read said information blocks written by said third computer code device, where at least one information block read by the fourth computer device identifies said at least one object and identifies all tools that used said at least one object; and a fifth computer code device configured to transmit at least one of said information blocks read in by the fourth computer code device to a new set of at least one application.

17. The computer program product according to claim 13, wherein said first computer code device is configured to transmit inter-application communication protocol messages; and wherein said second computer code device is configured to receive inter-application communication protocol messages.

\* \* \* \* \*